(No Model.)
L. C. IRVINE.
INDICATING POISE FOR LEVER SCALES.
No. 312,857. Patented Feb. 24, 1885.
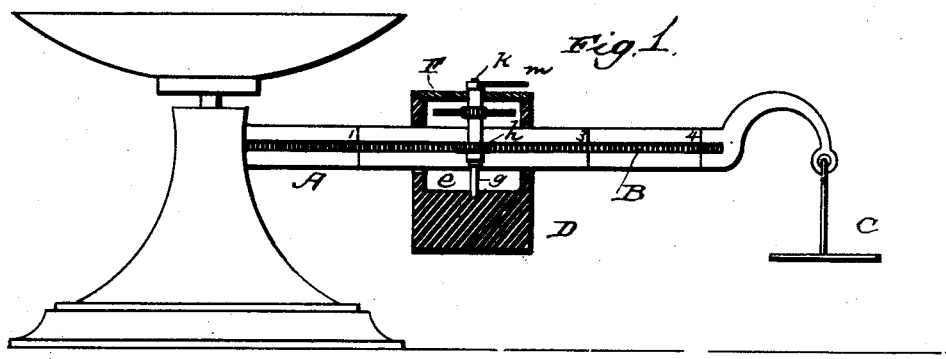
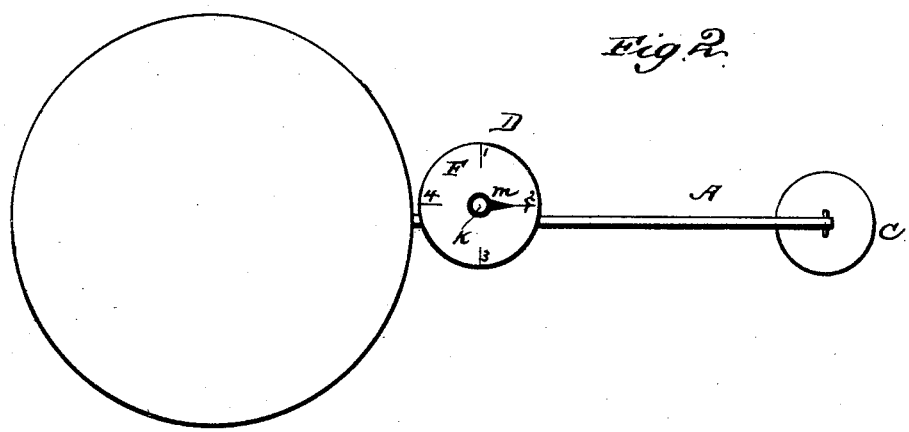
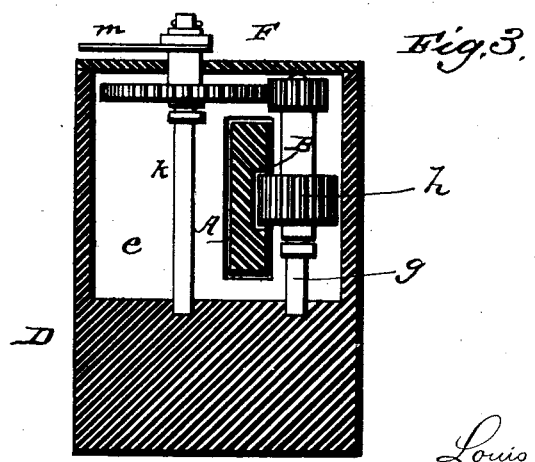
WITNESSES
INVENTOR
Louis C. Irvine,
by Anderson & Smith
his ATTORNEYS

UNITED STATES PATENT OFFICE.

LOUIS C. IRVINE, OF OREGON, MISSOURI.

INDICATING-POISE FOR LEVER-SCALES.

SPECIFICATION forming part of Letters Patent No. 312,857, dated February 24, 1885.

Application filed April 18, 1884. (No model.)

*To all whom it may concern:*

Be it known that I, LOUIS C. IRVINE, a citizen of the United States, residing at Oregon, in the county of Holt and State of Missouri, have invented certain new and useful Improvements in Scales; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a side view of the scale with my device shown in section. Fig. 2 is a top view, and Fig. 3 is a cross-sectional view.

This invention has relation to lever-scales; and it consists in the construction and novel arrangement of devices, all as hereinafter set forth, and pointed out in the appended claim.

In the accompanying drawings, the letter A designates the scale-beam, in which is formed the rack B, extending lengthwise thereof.

C indicates the constant weight-disk, which hangs from the end of the beam.

D represents the sliding weight, which is converted into an indicator in the following manner: A recess, $e$, is formed in the weight, and the walls of the recess are slotted in opposite sides, to provide for the passage of the scale-beam.

F is a dial-plate on the top of the slide, which is marginally graduated to correspond with the entire length of the rack-arm of the beam, or to the length of one of the subdivisions thereof, as may be desired, according to the character and capacity of the scale and the accuracy required in regard to the fractional weight.

In the chamber or recess of the slide-weight is a shaft, $g$, carrying a pinion, $h$, having accurate teeth engaging the rack B of the scale-beam. The shaft $g$ is geared to the stem $k$, which extends above the dial, and is provided with an index-hand, $m$. This indicating slide-weight or "scale-pea" having been properly engaged with the rack, is in accord therewith in its entire movement from one end to another.

The dial may be graduated to minute subdivisions, indicating very small portions of the unit of weight. In the illustration the scale-beam is graduated for four pounds, and the dial of the slide-weight is correspondingly graduated for four pounds. The constant weight shown is two pounds. In the position of the slide-weight it marks a counterbalance of two pounds and a half, which added to the constant weight makes four pounds and a half, the weight of the article in the pan.

I am aware that it is not new to provide a toothed scale-beam with a movable poise having a shaft carrying a gear-wheel to engage the same and move a pointer over a dial on the said weight; but in such cases the dial and pointer have been arranged on the vertical side of the weight, and the mechanism employed to operate the pointer of a more complicated construction than that which I have illustrated.

What I claim, and desire to secure by Letters Patent, is—

As an improvement in scales in which the beam is provided with a longitudinal rack to engage a gear-wheel upon a shaft to operate a pointer over a graduated dial, the combination of the beam A, having the rack B let into the said beam longitudinally thereof, the slide-weight D, having the recess $e$, open at opposite ends, the vertical shaft $g$, carrying the gear $h$, to engage the said rack, and the pinion to engage the gear-wheel at the upper portion of the shaft $k$, which shaft has a pointer, $m$, whereby the said pointer may be moved over the indicating-dial F on the upper face of the said slide-weight, substantially as shown and described.

In testimony whereof I affix my signature in presence of two witnesses.

LOUIS C. IRVINE.

Witnesses:
 HAMILTON BOYD,
 WILLIAM R. HOFFMANN.